US012644278B2

(12) United States Patent
Williams

(10) Patent No.: US 12,644,278 B2
(45) Date of Patent: Jun. 2, 2026

(54) ACCESS PANEL AND METHOD OF MANUFACTURE

(71) Applicant: Gabriel Williams, Winchester, VA (US)

(72) Inventor: Gabriel Williams, Winchester, VA (US)

( * ) Notice: Subject to any disclaimer, the term of this patent is extended or adjusted under 35 U.S.C. 154(b) by 522 days.

(21) Appl. No.: 18/086,358

(22) Filed: Dec. 21, 2022

(65) Prior Publication Data

US 2023/0332402 A1 Oct. 19, 2023

Related U.S. Application Data

(60) Provisional application No. 63/332,451, filed on Apr. 19, 2022.

(51) Int. Cl.
*E04B 9/00* (2006.01)
*E04B 9/04* (2006.01)

(52) U.S. Cl.
CPC ................ *E04B 9/003* (2013.01); *E04B 9/04* (2013.01); *E05Y 2900/131* (2013.01)

(58) Field of Classification Search
CPC ....... E04B 9/003; E04B 9/04; E05Y 2900/131
See application file for complete search history.

(56) References Cited

U.S. PATENT DOCUMENTS 5,255,479 A * 10/1993 Shepherd ................ E04F 19/08 49/449
7,568,318 B1 * 8/2009 Egan ....................... E04C 2/296 52/309.7
7,650,722 B1 * 1/2010 Melesky ............... E04F 11/062 52/198
7,836,638 B2 * 11/2010 Ogieglo .................... E06B 5/01 52/745.15

(Continued)

FOREIGN PATENT DOCUMENTS

CA 2661937 A1 * 3/2008 ............... B32B 3/14
CA 2892839 C * 2/2016 ............ E05D 15/00

(Continued)

OTHER PUBLICATIONS

Up Ceilings, Phantom Panels, Jun. 23, 2021, www.upceilings.com (retrieved via web.archive.org), p. 1-3, 5-7 and 14-22. (Year: 2021).*

(Continued)

*Primary Examiner* — Jessie T Fonseca
(74) *Attorney, Agent, or Firm* — McDonald Hopkins LLC

(57) ABSTRACT

An access panel system for providing access into a space behind a surface, such as a ceiling, is disclosed. The system comprises an access panel frame adapted to be disposed in a corresponding opening in the surface, the frame formed from a first sheet of drywall, the access panel frame having an upper frame surface, a lower frame surface and a frame opening, the frame opening formed by milling a section from the sheet of drywall. The system further comprises an access panel formed from a second sheet of drywall, wherein the access panel includes a stepped portion and a flanged portion milled from the second sheet of drywall, and wherein the stepped portion is laterally dimensioned to fit into the frame opening and the flanged portion is adapted to engage the upper frame surface.

7 Claims, 5 Drawing Sheets

(56) References Cited

U.S. PATENT DOCUMENTS

| | | | | |
|---|---|---|---|---|
| 9,631,407 | B2 * | 4/2017 | Wise | E05D 7/12 |
| 2006/0258284 | A1 * | 11/2006 | Melesky | E04B 9/003 454/349 |
| 2009/0277099 | A1 * | 11/2009 | Ogieglo | E06B 5/01 52/745.15 |
| 2012/0186179 | A1 * | 7/2012 | Melesky | E04B 9/001 52/404.4 |
| 2014/0137498 | A1 * | 5/2014 | Melesky | E06B 3/70 52/404.4 |
| 2016/0123068 | A1 * | 5/2016 | Wise | E04F 19/08 49/504 |
| 2018/0038155 | A1 * | 2/2018 | Melesky | E04B 1/7608 |

FOREIGN PATENT DOCUMENTS

| | | | | | |
|---|---|---|---|---|---|
| CN | 207211474 | U | * | 4/2018 | |
| CN | 112443074 | A | * | 3/2021 | E04B 9/003 |
| DE | 102019125138 | A1 | * | 3/2021 | E04B 9/003 |
| EP | 1903162 | A1 | * | 3/2008 | E04B 9/003 |
| EP | 1911496 | A2 | * | 4/2008 | A62C 2/06 |
| GB | 2456646 | A | * | 7/2009 | E04B 9/003 |
| WO | WO-9419147 | A1 | * | 9/1994 | B23Q 1/032 |
| WO | WO-2007014786 | A1 | * | 2/2007 | E04B 9/00 |

OTHER PUBLICATIONS

Walls & Ceilings, Grabber CNC-enabled PanelMax Hybrid, Mar. 27, 2018, www.wconline.com, p. 1. (Year: 2018).*

* cited by examiner

ACCESS PANEL AND METHOD OF MANUFACTURE

BACKGROUND

An access panel, or access door, to provide access from an exterior space, such as a room, into an interior space, such as above a drywall ceiling or behind a drywall wall, in the room, is known. Often it is desired that the access panel be generally discreet and concealed, visually blending into the surrounding surface, when viewed from the room.

An access panel may be one component of what may be referred to as an access panel system. The access panel system may also include an associated frame. The access panel may have a stepped profile, comprising a flanged portion and a stepped portion, the stepped portion being preferably centered relative to the flanged portion. The frame may have a frame opening corresponding in shape and size to the shape and size of the stepped portion of the associated access panel, but having dimensions slightly greater, to permit the frame opening to receive the stepped portion of the access panel to fit into the frame opening.

Typically to install such an access panel system in a ceiling, such as a drywall ceiling, an opening slightly larger than the frame may be cut into the drywall ceiling. The frame may then be conventionally installed within the opening, and a conventional butt joint may be installed in the gap between the frame and the opening. The access panel may then be placed in, and supported by, the frame.

An access panel system may be similarly installed in a wall, such as a drywall wall, although a hinged mechanism may be required, as is known.

Certain of such access panels have conventionally been formed of Glass-Fiber-Reinforced Gypsum (GFRG). As is known, such GFRG panels may typically be formed in a mold, removed, and then have their edges sanded. This can be a time-consuming process. This process may also require a dedicated mold for each panel size, thereby limiting size flexibility and options for such access panels. Panels made of GFRG may also have a relatively high moisture content, which may potentially lead to formation of mold, they may be somewhat fragile, and may potentially sag. As a result, panels made of GFRG have a relatively high material and production cost.

The present disclosure is provided to address these and other problems.

SUMMARY

It is an object of the present disclosure to provide a method of forming an access panel, and associated frame, such as from sheets of conventional drywall.

It is a further object of the present disclosure to provide an access panel, and associated frame, according to such a method.

This and other objectives and advantages may become apparent from the following description taken in conjunction with the accompanying Figures.

DESCRIPTION OF THE PREFERRED EMBODIMENT

Figure 1:
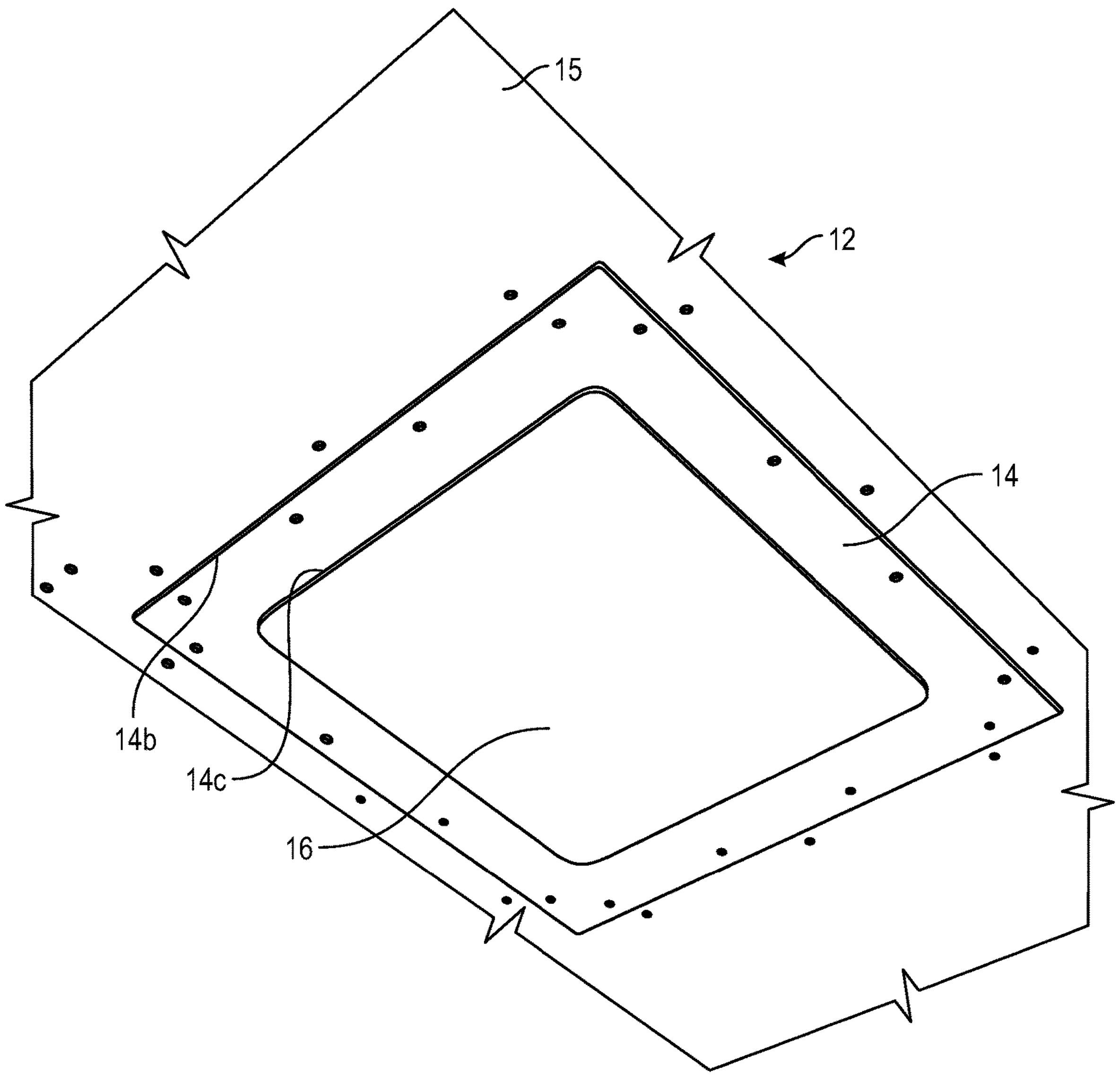
FIG. 1 is a perspective view of an access panel system, installed in a ceiling, in accordance with the present invention.
Figure 2:
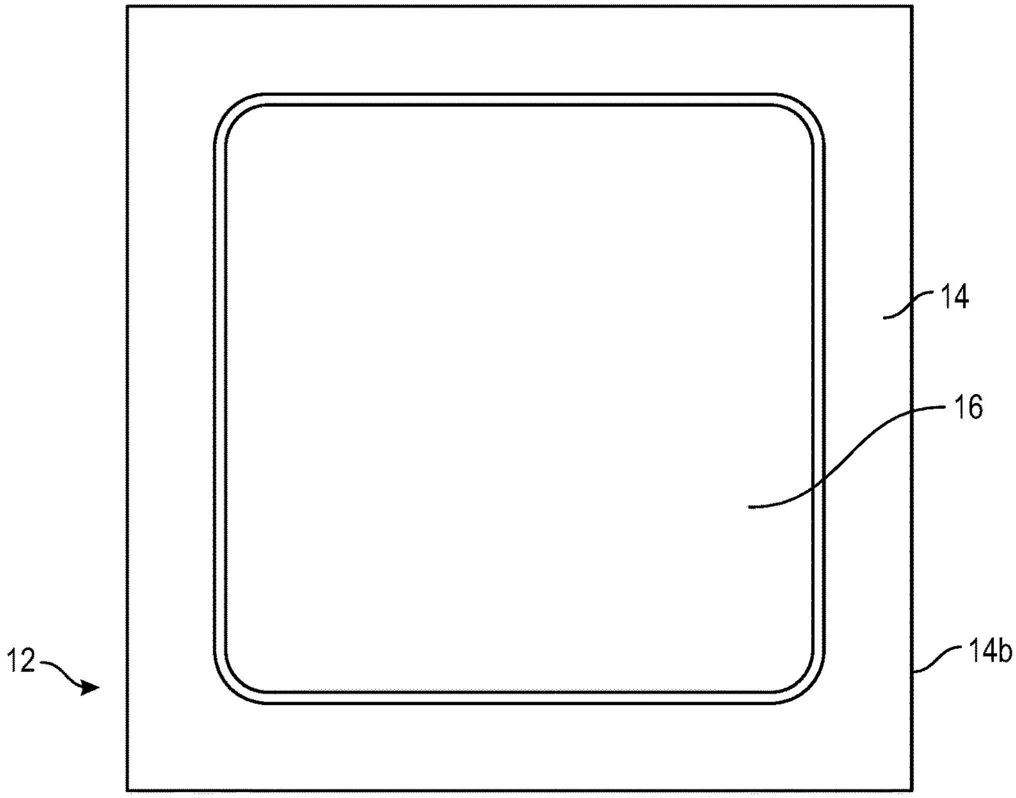
FIG. 2 is a plan view of the access panel system of FIG. 1.

While this invention is susceptible of embodiments in many different forms, there will be described herein in detail, a specific embodiment thereof, with the understanding that the present disclosure is to be considered an exemplification of the principles of the invention and is not intended to limit the invention to the specific embodiment illustrated.

The present method may utilize a Flextos Supercut CNC Automated Milling and Sawing Table (the milling machine), manufactured by Flextos GmbH of Raubling, Germany. The Supercut CNC is available in the US as the Hybrid CNC/PanelMax ST48, distributed by Grabber Construction Products. Alternative conventional CNC milling machines may also be utilized.

In accordance with the present invention, an access panel system 12 may include an access panel frame 14 having a frame opening 14*a*, into which an access panel 16 may be positioned. The frame 14 may be conventionally installed in an opening of a ceiling 15, such as a conventional drywall ceiling. The access panel frame 14 and the access panel 16 may preferably be formed of conventional drywall. As is known, conventional drywall is significantly less expensive than GFRG. A sheet of drywall typically is formed of a gypsum core, covered on opposing sides by a layer of paper 18—a face paper on a side which is typically the outwardly facing side (when installed) of the drywall sheet and a backing paper on the opposing side, which side is typically the inwardly (when installed) facing side of the drywall sheet.

The frame 14 may be formed by milling a section from a first sheet of conventional drywall, preferably a single sheet of ⅝" (0.63") thick drywall, to form the frame opening 14*a* within the frame 14. However a ½" design may be made with a ½' step. The exterior facing edge of the periphery of the frame 14 may be shaped, such as rounded with a 1/16" radius, to permit a better, more aesthetic finished joint with the ceiling 15.

As discussed in greater detail below, the access panel 16 may be formed in a two-step milling process, by milling a second sheet of conventional drywall, preferably a single sheet of 1" thick drywall, to form the access panel 16 having a stepped profile comprising a flanged portion 16*a*, which may be 0.37" in height, and a stepped portion 16*b*, which may be 0.63" in height, which corresponds to the thickness of the frame 14). The stepped portion 16*b* is adapted to fit through the frame opening 14*a*, and the flanged portion 16*a* is adapted to rest on an upper surface 14*b* of the frame 14, such that the exterior facing (when installed) surface of the frame 4 is substantially flush with the exterior facing surface (when installed) of the access panel 16. The dimensions of the frame opening 14*a* (i.e., the dimension of the section removed from the first sheet of drywall) may be slightly larger than the corresponding dimensions of the stepped portion 16*b*, so as to provide a peripheral gap between the frame opening 14*a* and the stepped portion 16*b* of 0.06".

Figure 5:
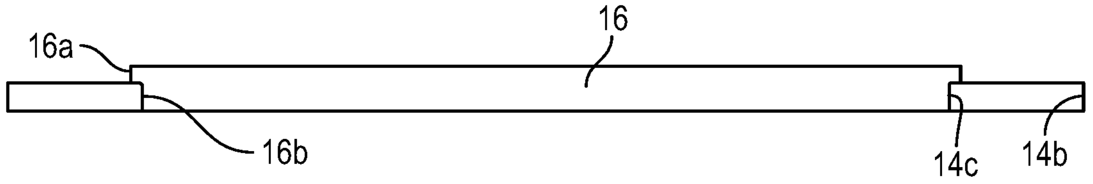
FIG. 5 is a sectional view of the access panel of FIG. 4.
Figure 5A:
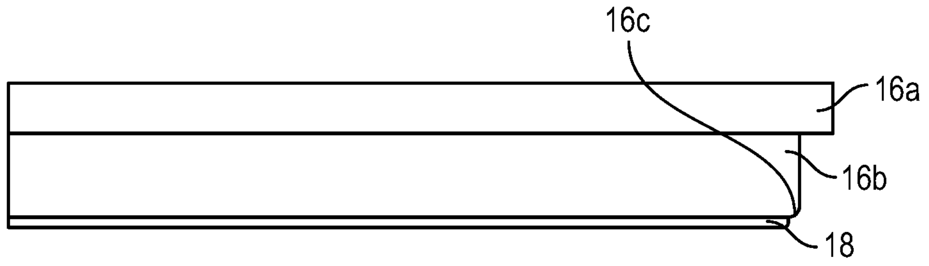
FIG. 5*a* is a detailed view of the access panel of FIG. 5.
Figures 6, 7:
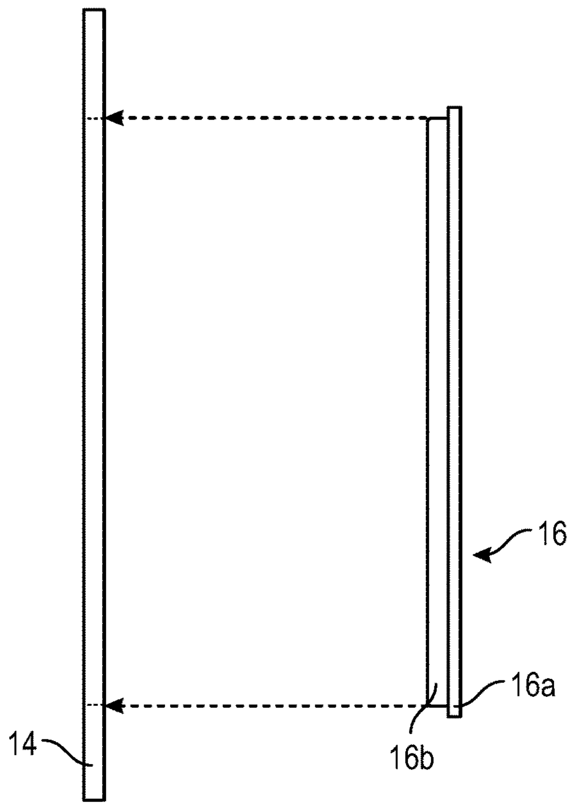
FIGS. 6 and 7 are respective side views of the frame and access panel of the present invention.
Figure 8:
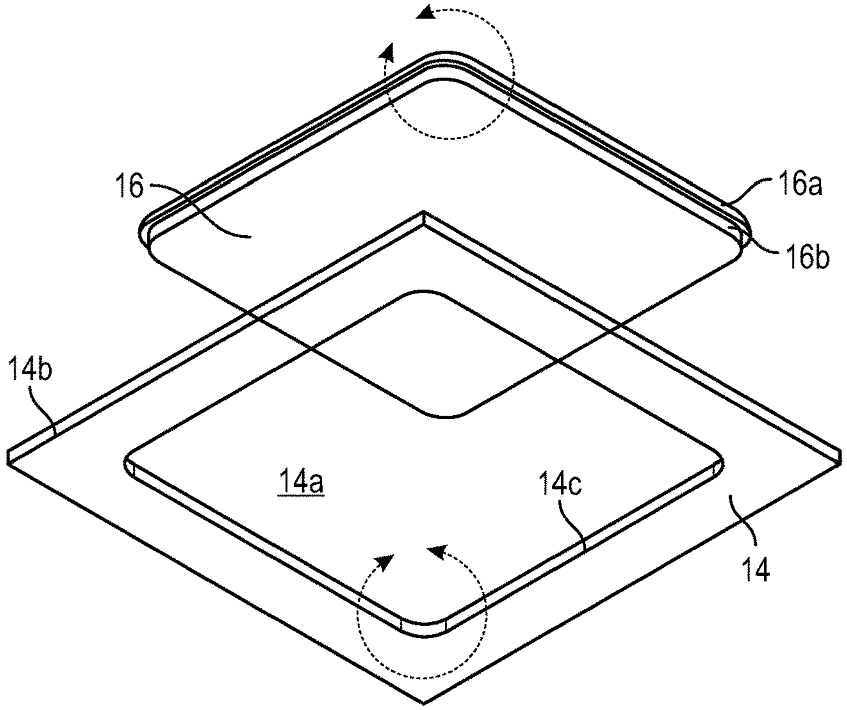
FIG. 8 is an exploded view of the access panel system of FIG. 1.
Figure 9:
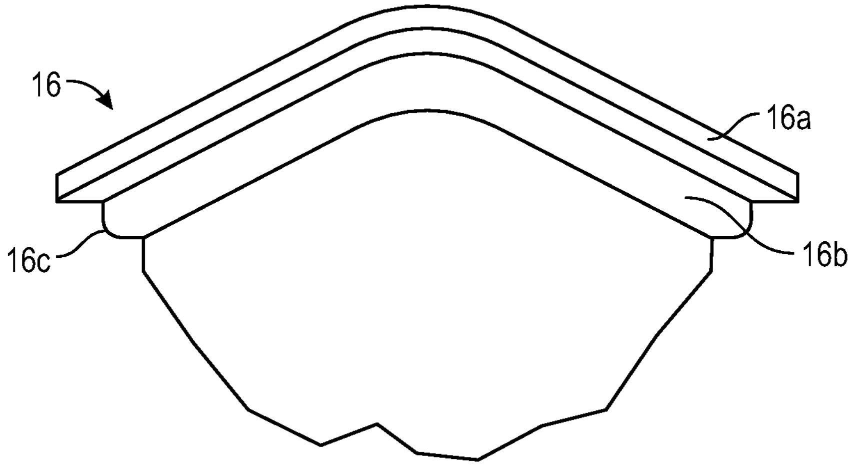
FIG. 9 is a detailed view of a rounded corner of the access panel of FIG. 8.
Figure 10:
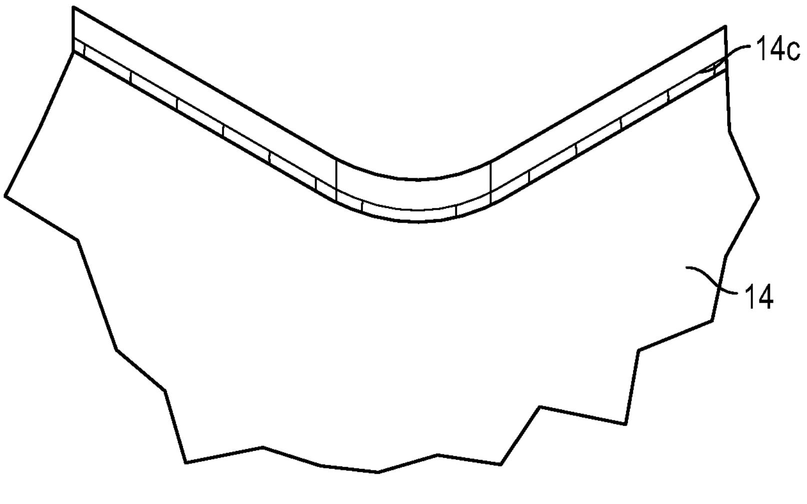
FIG. 10 is a detailed view of a rounded inner corner of the frame of FIG. 8.

Following the milling step, milled edges of the milled drywall, particularly the corners, may be sanded and then sealed, as needed, by an application of a sealant such as a conventional drywall primer, such as to seal the junction between the drywall interior core and the drywall paper. But as discussed below, and as illustrated in FIG. 5*a*, the milling bit utilized to form the stepped portion 16*b* may preferably provide a shaped, preferably rounded, edge, such as a rounded edge having a radius of the order of ⅛"-1/16", reducing or otherwise eliminating a tendency for the drywall paper 18 to tear, thereby eliminating the need for the sanding step.

The following is a detailed description of one embodiment of manufacturing a version of the access panel 16 to fit into the frame opening 14*a* of the associated frame 14. In this embodiment, the access panel 16, and the frame opening 14*a* of the associated frame 14 are generally square. However it is to be understood that other geometries, such as a rectangle or a circle, are contemplated.

According to this embodiment, the flanged portion 16*a* of the access panel 16 is generally square, having 18.52" sides, but having generally rounded corners having a radius of 1.00". The stepped portion 16*b* is also generally square, having 18.02" sides, with rounded corners having a radius of 1.25".

The frame 14 may be generally square, having 24.08" sides and squared corners. The frame opening 14*a* may also be generally square, having 18.08" openings, and rounded corners having a radius of 1.25". The frame 14 has an outer peripheral edge 14*b*, which may be shaped, such as rounded, on its interior facing edge, such as to a 1/16" radius, which may help make a better finished join when installed in the ceiling. The frame 14 has an inner peripheral edge 14*c*, which defines the frame opening 14*a*. The inner peripheral edge 14*c* may also be shaped, such as rounded, on its interior facing edge, such as to a 1/16" radius.

Utilizing the milling machine, creation of the drywall access panel 16 may begin in CAD software.

Drawing the Panel 16 in the CAD Software

According to the present embodiment, a square two-dimensional sketch may be made (i.e., coordinates may be plotted) measuring 18.52"×18.52" (the dimension of the flanged portion 16*a* of the access panel 16). Note: for different sizes the formula would be blank number 0.95. The sketch may be filled to create a panel. A second square sketch is made measuring 18.02"×18.02" (the dimension of the stepped portion 16*b* of the access panel 16). Note: for different sizes the formula would be blank number 0.02. The second square sketch may be placed within the large sketch (in the software), establishing a critical dimension of 0.25" [(18.52"-18.02")/2] between the outside of the inner square and inside of the larger square. This will maintain even spacing between the inner and outer square. Once aligned, corner chamfers may be added. These chamfers may help with rigidity of corner edging, as well as provide a more aesthetic appearance of the access panel 16. A 1.25" radius may be added with a conditional formula to apply the radius to each corner of the stepped portion 16*b* of the panel 16, and a 1.50" radius may be added with a conditional formula to apply the radius to each corner of the flanged portion 16*a* of the panel 16. The inner panel is now finished three-dimensionally but must be transposed into a two-dimensional part for it to be read by the CNC software. The drawing may be translated into an idw file from an ipt file. The idw file may allow lines of the door to be exported to a dxf file for interpretation by the CNC software.

Drawing the Frame 14 in the CAD Software

Figure 3:
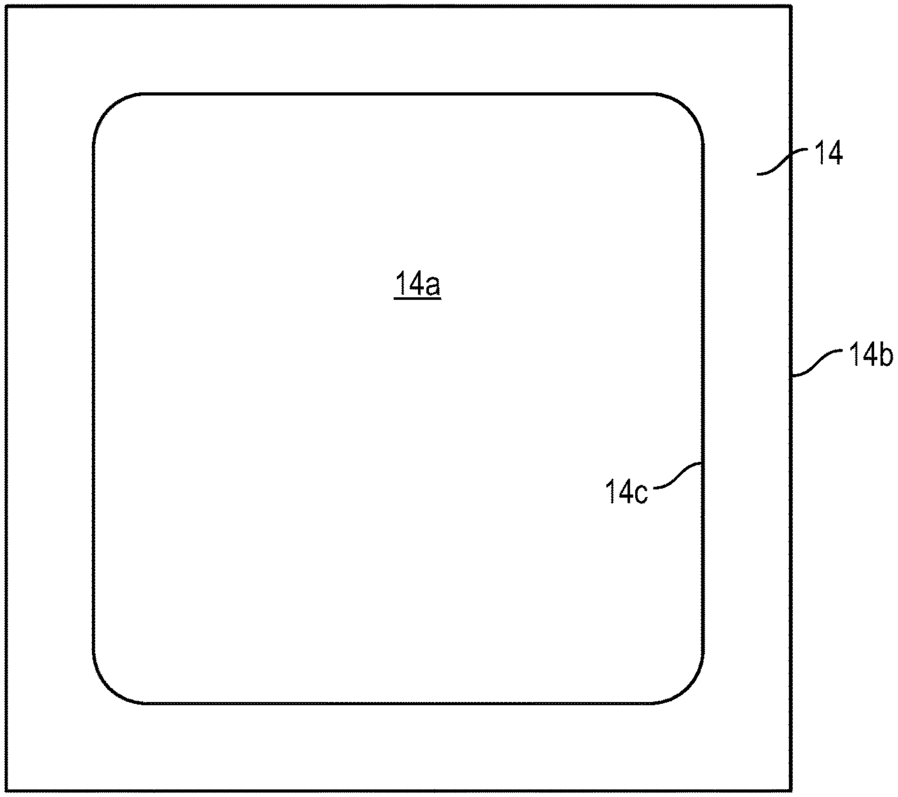
FIG. 3 is a plan view of a frame having a frame opening, as a component of the access panel of FIG. 1.
Figure 4:
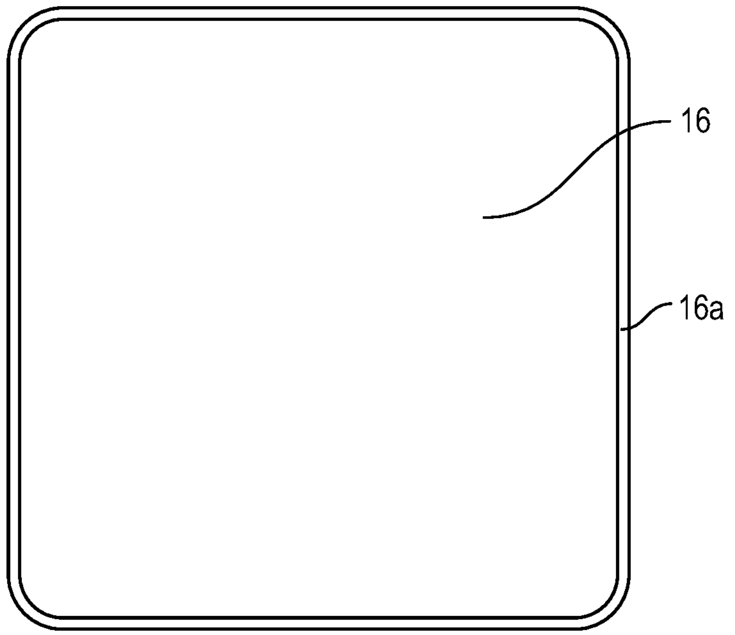
FIG. 4 is a plan view of an access panel, as a component of the access panel system of FIG. 1.

In the instant embodiment, the frame 14 may be three inches greater in outside dimension than the access panel 16, for the frame 14 to be properly mounted to ceiling joists and still allow proper operation of the access panel 16. See FIG. 3.

The frame 14 may start with a square that may be approximately six inches greater than the size of the associated access panel 16. Therefore, an ~18"×18" panel preferably requires a ~24"×24" frame. Right now, there is a panel that is 24 inches×24 inches, a cut needs to be made within the part in order for the panel to lock into place. A new sketch may be made measuring 18.06"×18.06". There is roughly a 0.06" gap between the frame 14 and panel 16 when the product is complete. This is the difference of the 18.08" (frame measurement) and 18.02" (panel measurement). The radii within this cut are nearly a 0.010" difference to that of the panel in order to maintain consistency and symmetry. The frame 14 may then be exported into a two-dimensional drawing. Both of the dxf files are then uploaded into ESTLcam, the programming software of the particular machine. Only one part (one of the access door 16 and the frame 14) can be programmed at a time since each part is made out of a different thickness of drywall.

The first part to program may be for the milling is the panel 16. One important part is creation of the stepped portion 16*b* via a special milling operation. In the program a 12 mm (0.47") bit is selected to mill ⅝" deep of the 1" thick drywall. The 12 mm bit cuts a 12 mm wide slot. Thus to mill the 1" thick drywall to form the 18.02" (across) stepped portion 16*b*, the programming must position the 12 mm bit on the inside of the outside measurement of 18.95". During this operation, the operator may line up the milling bit to the measurement of a depth of ⅝. Once the bit may be aligned to ⅝", a zero point may be is selected. This may be important to the process of creating a panel 16 because it is how the next bit to cut will align. Once a zero point is selected an operator can begin the cut of the stepped portion 16*b*. When the bit is cutting, paying proper attention to the cutting is important, for monitoring dust interference and accuracy. Depth gauges may be used to check the ⅝" depth cut within the 1" shaft liner board.

Once the cut forming the stepped portion has been completed, the router head may be removed, and a new router head may be placed with a bit having a length of 1" (to cut all of the way through the 1" sheet of drywall). Returning to the program, the 1 inch cutting bit may be selected to cut on the outside of the 18.52" measurement (so as to leave 18.52" of material). It is important that while programming, the zero has to stay the same or the dimensions will not line up. It should be noted that manual changing of the bit may be eliminated, such as by utilizing a milling machine having an auto-changing bit or a double router-head.

The bit selected for cutting the stepped portion 16*b* must also be deleted after the spacing of the door is correct. If the first bit is not deleted from the program, the machine may rerun the first bit geometric spacing and ruin the cutting, and for multiple door spacing the first bit may be needed to create the same space between doors but then may be deleted once the doors are aligned for the second bit program.

After the panel 16 is completed, it may be removed. A sanding block may then be used to ensure burr free paper edges of the door, if needed, however the front is generally finished. A round paint brush may then be used to remove any leftover drywall dust on the edges of the panel. Leaving this dust may interfere with flushness of the panel 16 within the frame 14. Once all dust is removed, a square paint brush may be used to apply the sealant to the cut surface of the stepped portion 14*b*. This will minimize or prevent cracking of the drywall and create a smooth durable surface for handling. The access panel 16 is now finished.

Milling of the Frame 14

The 1" drywall is removed, and ⅝" drywall board is physically uploaded. The frame 14 now needs to be programmed. Within the program, one may upload the dxf file of the frame 14 and select a 1" bit to cut the outside 24" measurement and inside of the 18.08" measurement. The starting cut of the inside of the frame 14 must begin on a flat contour or cut. If it begins on a corner when it starts and finishes it may actually hit the completed part during its exit cut. It is important that the 18.08 measurement cut is not on the frame side but of the left-over scrap piece or cut where the access panel will go. Before beginning the cut, the operator may preferably check the bit as constant bit changing may create misalignments in the cutting head. The bit must also be aligned so that the chamfer where the bit begins is at the top of the cutting head so that when it cuts the frame the paper is cut perfectly. Once the operator has checked the alignment the frame is good to run. The frame 14 may then be removed, and the drywall sealant may be applied to the inside and outside cut surface. The sealed access panel 16 and frame 14 may then be allowed to dry, such as for an hour or so.

Because the access panel 16 is formed of drywall, it can be painted or otherwise finished, to better visually blend into the surrounding surface, such as the surrounding ceiling or wall.

It is to be understood that this disclosure is not intended to limit the invention to any particular form described, but to the contrary, the invention is intended to include all modifications, alternatives and equivalents falling within the spirit and scope of the invention.

I claim:

1. A method of forming an integrated access panel system for providing flush mounted access through a rough opening in a drywall ceiling into a space above the drywall ceiling, the drywall ceiling having an exterior facing surface, the integrated access panel system comprising a frame and an associated access panel, the method comprising:

providing a first sheet of conventional drywall, the first sheet of conventional drywall comprising a gypsum core of substantially uniform thickness, covered on a first side by a layer of face paper and on a second, opposing side by a layer of backing paper;

utilizing a CNC milling machine having a bit to controllably mill a section from the first sheet of conventional drywall to form the frame, the frame having a milled peripheral edge and a milled frame opening edge defining a frame opening within the frame, the milled peripheral edge dimensioned to fit into the rough opening in the drywall ceiling, the layer of face paper of the frame adapted to be substantially flush with the exterior facing surface of the drywall ceiling when installed in the drywall ceiling;

providing a second sheet of conventional drywall having a thickness greater than the thickness of the first sheet of conventional drywall, the second sheet of conventional drywall comprising a gypsum core of substantially uniform thickness covered on a first side by a layer of face paper and on a second, opposing side by a layer of backing paper;

utilizing the CNC milling machine having the bit to controllably mill the second sheet of conventional drywall to create the access panel, the CNC milling machine forming the access panel having a stepped profile comprising a flanged portion and a stepped portion, the stepped portion having a peripheral edge dimensioned to provide a controlled fit with the frame opening and the flanged portion adapted to rest on an upper surface of the frame such that when the access panel is disposed in the frame, the layer of face paper of the access panel is substantially flush with the layer of face paper of the frame.

2. The method of claim 1, wherein the step of milling to form the stepped portion includes milling an inwardly shaped edge about a periphery of the stepped portion.

3. The method of claim 2, wherein the inwardly shaped edge is rounded.

4. The method of claim 3, wherein the step of milling the inwardly shaped edge blends the inwardly shaped edge into the layer of the face paper of the access panel.

5. The method of claim 1 wherein the milled frame opening edge and the peripheral edge of the stepped profile define a gap having a dimension of the order of 0.06 inches.

6. The method of claim 1 wherein the first sheet of drywall is substantially ⅝" thick, the second sheet of drywall is substantially 1" thick and the stepped portion has a height of substantially ⅝".

7. The method of claim 1 wherein the first sheet of drywall is substantially ½" thick, the second sheet of drywall is substantially 1" thick and the stepped portion has a height of substantially ½".

* * * * *